(12) United States Patent
Tschann et al.

(10) Patent No.: US 8,979,048 B2
(45) Date of Patent: Mar. 17, 2015

(54) ROTATING ELECTRONIC DISPLAY ADAPTER

(71) Applicant: Rosemount Aerospace Inc., Burnsville, MN (US)

(72) Inventors: Matthew A. Tschann, Burnsville, MN (US); Kenneth J. Freeman, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 190 days.

(21) Appl. No.: 13/899,199

(22) Filed: May 21, 2013

(65) Prior Publication Data

US 2014/0346296 A1 Nov. 27, 2014

(51) Int. Cl.
- *A47B 96/00* (2006.01)
- *B64D 43/00* (2006.01)
- *F16M 11/04* (2006.01)
- *F16M 11/08* (2006.01)
- *F16M 13/02* (2006.01)

(52) U.S. Cl.
CPC ............ *B64D 43/00* (2013.01); *F16M 11/041* (2013.01); *F16M 11/08* (2013.01); *F16M 13/022* (2013.01); *F16M 2200/024* (2013.01)
USPC .............. 248/221.11; 248/222.41; 248/274.1; 403/345; 224/545

(58) Field of Classification Search
CPC .................. F16M 2200/021; F16M 2200/024; F16M 13/022; F16M 13/02; F16M 11/041; F16M 11/08
USPC ............... 248/221.11, 222.41, 222.52, 274.1, 248/276.1, 309.1, 188.1; 403/43, 345, 350, 403/351; 224/545
See application file for complete search history.

(56) References Cited

U.S. PATENT DOCUMENTS

| | | | |
|---|---|---|---|
| 4,570,892 A | 2/1986 | Czech et al. | |
| 6,588,719 B1 * | 7/2003 | Tubach | ...................... 248/282.1 |
| 6,801,426 B2 * | 10/2004 | Ichimura | .................. 361/679.06 |
| 7,303,171 B1 | 12/2007 | Chen | |
| 7,506,850 B2 | 3/2009 | Chang | |
| 7,686,250 B2 | 3/2010 | Fortes et al. | |
| 7,929,284 B2 | 4/2011 | Shen | |
| 8,215,583 B2 | 7/2012 | Groomes et al. | |
| 8,308,114 B2 * | 11/2012 | DeBuhr et al. | ............. 248/188.1 |
| 8,701,953 B2 * | 4/2014 | Bopp et al. | ..................... 224/547 |
| 8,870,143 B2 * | 10/2014 | Kubin | ........................ 248/309.4 |

\* cited by examiner

*Primary Examiner* — Todd M Epps
(74) *Attorney, Agent, or Firm* — Locke Lord LLP; Scott D. Wofsy; Joshua L. Jones (57) ABSTRACT

An assembly includes an adapter portion configured for attachment to a rear surface of an electronic display device and a base portion configured to be mounted to a fixed structure in the cockpit of an aircraft. The adapter portion has a cylindrical barrel portion having a plurality of circumferentially disposed radially outwardly extending keys, a first radially inwardly extending recess corresponding to a landscape position of the display device and a second radially inwardly extending recess corresponding to a portrait position of the display device. The base portion includes an upper surface with a circular reception port formed therein for receiving the barrel portion of the adapter portion, and the reception port has a plurality of radially outwardly extending circumferentially disposed keyways formed therein for receiving the plurality of keys on the barrel portion of the adapter portion.

20 Claims, 6 Drawing Sheets

FIG. 6

ROTATING ELECTRONIC DISPLAY ADAPTER

BACKGROUND OF THE INVENTION

1. Field of the Invention

The subject invention relates to improvements in mounts for portable electronic displays, and more particularly, to a rotating adapter for mounting a portable electronic flight bag (EFB) on a supporting surface within the cockpit of an aircraft.

2. Description of Related Art

An EFB is an electronic display device that a pilot may use for preflight check lists and similar activities. EFB's are generally handheld, portable devices that a pilot can take from flight to flight. Information about a pilot's flight may be preloaded onto the EFB so that the pilot can access it prior to, during and after the flight.

In the past, a pilot may have simply placed an EFB loosely within the cockpit of an airplane, e.g., on the floor or on a console, which could lead to problems during the flight. For example, the EFB could become lost among other items in the cockpit, or the position of the EFB might shift during the flight. Further, if there is turbulence, the EFB could become damaged if it is not secured to a fixed surface within the cockpit.

Partially in response to these concerns, the U.S. Federal Aviation Administration (FAA) has published guidelines designating three separate classes of EFB hardware approved for use under progressively more demanding conditions. Specifically, Class 1 devices are standard commercial-off-the-shelf (COTS) equipment such as laptops or handheld electronic devices. These devices are used as loose equipment and are typically stowed during critical phases of flight. A Class 1 EFB is considered a Portable Electronic Device (PED). These may connect to aircraft power and interface to other systems via certified (STC) docking station and/or power source. This would allow the Class 1 device to interface with other systems through the certified interface and other devices through an expansion port interface.

Class 2 devices are also Portable Electronic Devices, and range from modified COTS equipment to purpose-built devices. They are typically mounted in the aircraft with the display being viewable to the pilot during all phases of flight. Mounts can include certified structural mounting devices or kneeboard devices. These devices may connect to aircraft power and data sources, e.g. through an ARINC 429 interface. A Class 2 EFB can be used for bi-directional data communication with other aircraft systems. In this class, a single line replaceable unit (LRU) would be an optimal solution based on the ease of installation and replacement.

Class 3 devices are considered "installed equipment" and are subject to airworthiness requirements defined by the FAA. Unlike PEDs, these devices must be under design control. The hardware is subject to a limited number of RTCA DO-160E requirements (for non-essential equipment—typical crash safety and Conducted and Radiated Emissions (EMC) testing). There may also be certain requirements for software. Class 3 EFBs are typically installed under STC or other airworthiness approval.

Mounting brackets used for Class 2 and Class 3 hardware typically do not permit easy removal of the electronic equipment. The orientation and/or position of the electronic equipment also cannot be easily changed to accommodate user preference. Those mounting brackets that do permit adjustment, require considerable manipulation with both hands, which can be distracting and inconvenient for the pilot or other operator.

It would be beneficial to provide a mounting assembly that allows for easy temporary installation of a Class 2 EFB on a supporting console within the cockpit of an aircraft without the use of any tools, fasteners or complicated moving parts.

SUMMARY OF THE INVENTION

The subject invention is directed to a new and useful assembly for mounting an electronic display device to a supporting structure, such as a console, within the cockpit of an aircraft. The assembly incudes an adapter portion configured for attachment to a rear surface of the electronic display device and a base portion configured to be mounted to a fixed structure, such as a console, in the cockpit of the aircraft.

The adapter portion of the mounting assembly has a mounting plate for securement to the rear surface of the display device with a plurality of fasteners, and a cylindrical barrel portion that extends away from the rear surface of the display device. The barrel portion has three circumferentially disposed radially outwardly extending keys. The barrel portion further includes a first radially inwardly extending recess corresponding to a landscape position of the display device and a second radially inwardly extending recess corresponding to a portrait position of the display device.

The base portion of the mounting assembly includes an upper surface or wall with a circular reception port formed therein for receiving the barrel of the adapter portion. The reception port has three radially outwardly extending circumferentially disposed keyways formed therein for receiving the three corresponding keys formed on the barrel of the adapter portion.

In addition, the mounting assembly includes a manually operated plunger operatively associated with the base portion for selectively engaging the first and second recesses in the barrel of the adapter portion to prevent relative rotation of the adapter portion and the base portion. A locking nut is also provided for selectively securing the plunger in an engagement position relative to the base portion.

Preferably, the three keys and keyways are positioned so that an initial engagement position of the barrel within the reception port corresponds to the display device having an orientation that is 30° clockwise from the landscape position of the display device and 120° clockwise from the portrait position of the display device.

The barrel preferably includes a circumferential slot that is located axially above the three keys for engaging an annular retaining lip that surrounds the reception port in the upper surface of the base portion. The adapter portion also includes a plurality of spring loaded plungers retained in the barrel and mounted to bear against a bottom plate of the base portion to provide pressure against the retaining lip to add resistance against the rotation of the barrel within the reception port.

These and other features of the mounting assembly of the subject invention and the manner in which it is employed within the cockpit of an aircraft will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the mount assembly of the subject invention without undue experimentation, preferred embodiments thereof will be described in detail herein below with reference to certain figures, wherein.

DETAILED DESCRIPTION OF PREFERRED EMBODIMENTS

Figure 1:
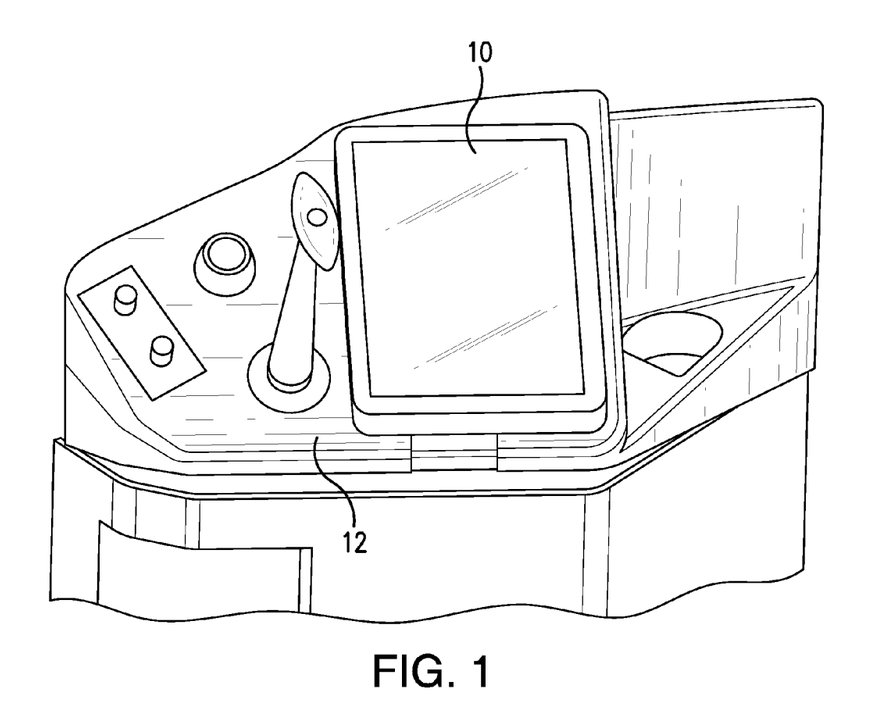
FIG. 1 shows an electronic display device, in the form of an electronic flight bag, mounted on the console in the cockpit of an aircraft.

Referring now to the drawings, wherein like reference numerals identify similar structural features or aspects of the subject invention, there is illustrated in FIG. 1 an electronic display device 10 that a pilot may use for preflight check lists and similar activities within the cockpit of an aircraft.

The electronic display device 10 is removably mounted to a supporting structure or console 12 in the cockpit of an aircraft using the mounting assembly of the subject invention, which is described in greater detail herein below. The mounting assembly of the subject invention enables a pilot to easily and quickly mount the electronic display device 10 to a supporting surface or console 12 in the cockpit of an aircraft without any tools, fasteners or latches.

Figure 2:
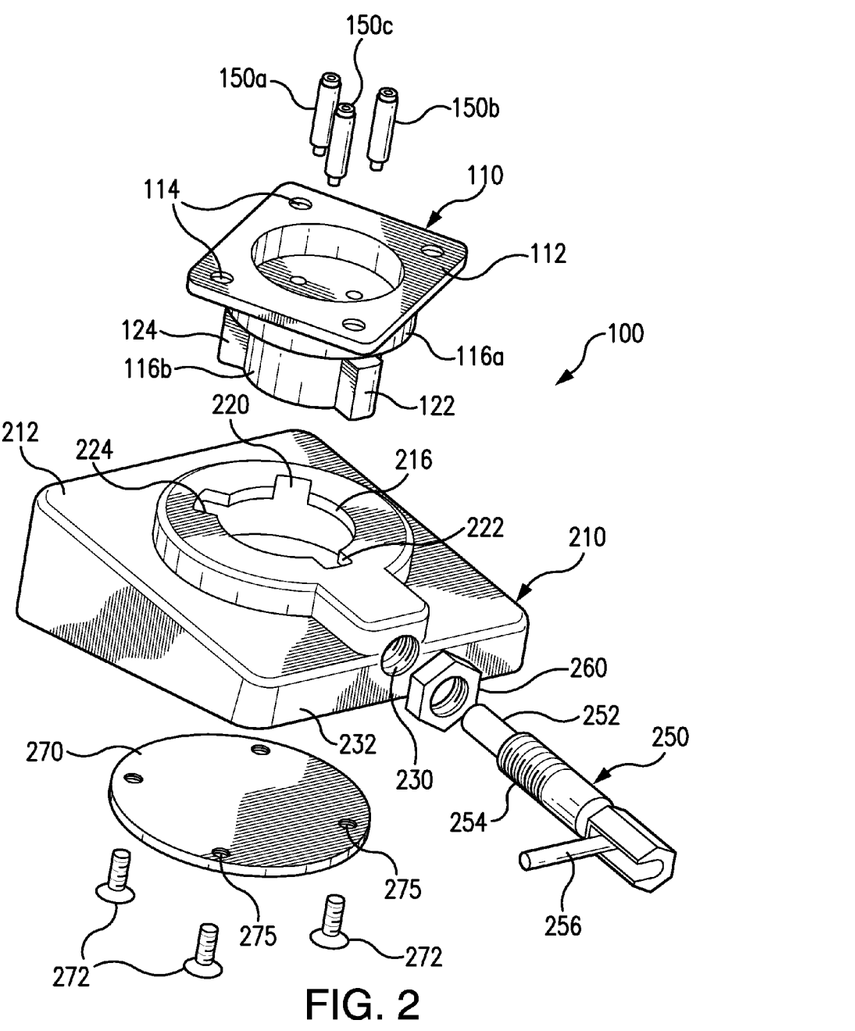
FIG. 2 is an exploded perspective view of the mounting assembly of the subject invention, with parts separated for ease of illustration, including an adapter portion configured for attachment to a rear surface of the electronic display device and a base portion configured to be mounted to the console in the cockpit of the aircraft.
Figure 3:
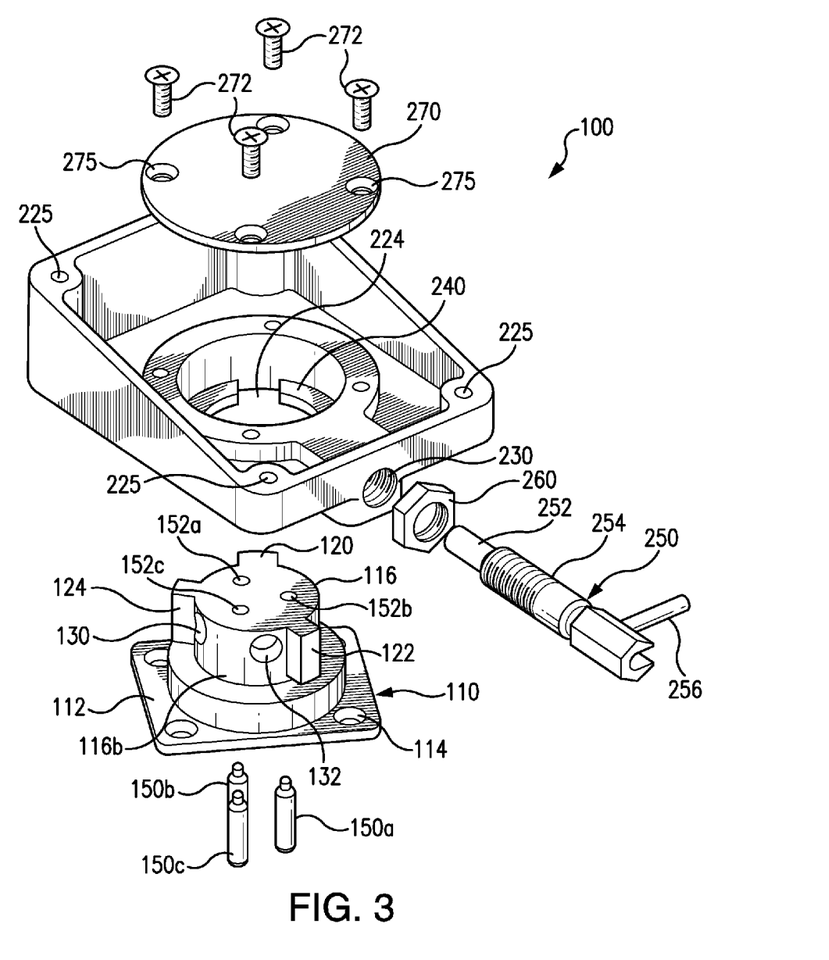
FIG. 3 is an exploded perspective view of the mounting assembly of the subject invention, with parts separated for ease of illustration, and inverted from the view shown in FIG. 2.

Referring to FIGS. 2 and 3, there is shown the mounting assembly of the subject invention, which is designated generally by reference numeral 100. Mounting assembly 100 includes two main components. These components include an adapter portion 110 configured for attachment to a rear surface of the electronic display device 10 and a base portion 210 configured to be mounted to the console 12 or other fixed structure in the cockpit of an aircraft.

The adapter portion 110 of mounting assembly 100 has a mounting plate or flange 112 having a plurality of apertures 114 formed therein. The apertures 114 accommodate threaded fasteners (not shown) that are used to secure the adapter portion 110 to the rear surface of the display device 10. A cylindrical barrel portion 116 depends from the undersurface of the mounting plate 112 of adapter portion 110. The barrel portion 116 includes an upper barrel section 116a having a first diameter and a lower barrel section 116b having a second diameter that is less than that of the upper barrel section 116a.

The lower section 116b of the barrel portion 116 has three circumferentially disposed radially outwardly extending keys designated by reference numerals 120, 122 and 124. As illustrated in FIGS. 2 and 3, the three keys are essentially similar in dimension and shape. It is envisioned however, that one or more of the keys can differ in size and/or shape from the other keys on the barrel portion 116. However, it should be appreciated that at least one of the keys should be larger than the other keys and/or the keys should be unequally spaced apart from one another so that the keys do not drop into the keyways when the barrel portion 116 is rotated within the reception port 216

It is also envisioned that different key arrangements can be provided by a manufacturer so that the mounting assembly 100 may be customized for a particular aircraft or display device, or a skeleton key approach could be employed so that there is a single generic version of the mounting assembly.

The lower section 116b of barrel portion 116 further includes two radially inwardly extending recesses 130 and 132. These two recesses are separated by a 90° arc. The first radially inwardly extending recess 130 corresponds to a landscape mounting position of the display device 10, as described in more detail below with respect to FIG. 5. The second radially inwardly extending recess 132 corresponds to a portrait mounting position of the display device 10, as described in more detail below with reference to FIG. 6. It is envisioned that the arc between the two recesses 130, 132 does not have to be a 90° arc. Indeed, the extent of the arc between the recesses may depend upon the configuration of the cockpit or the structure of the console. For example, there may be cases where a 45° or 50° degree rotation is adequate to change the perception of portrait versus landscape and vice versa.

The base portion 210 of mounting assembly 100 includes an inclined upper surface or top wall 212. A circular reception port 216 is formed within the inclined upper surface 212 for receiving the barrel portion 116 of the adapter 110. The reception port 216 of base portion 210 has three radially outwardly extending circumferentially disposed keyways 220, 222 and 224 formed therein. These three keyways are dimensioned and configured to cooperatively receive the three corresponding keys 120, 122 and 124 formed on the lower barrel section 116b of the adapter portion 110, to rotatably and releasably mount the display device 10 to the cockpit console 12, as shown in FIG. 1. Base portion 210 also includes a plurality mounting apertures 225 for accommodating fasteners (not shown) that secure the base portion to the cockpit console 12.

With continuing reference to FIGS. 2 and 3, mounting assembly 100 further includes a manually operated plunger 250 for selectively engaging the adapter portion 110 to prevent relative rotation of the adapter position 110 and the base portion 210 when the display device 10 is in its landscape or portrait position. More particularly, the plunger 250 includes an engagement shaft 252 dimensioned and configured to selectively engage the radially inwardly extending recesses 130 and 132 in the lower barrel section 116b of barrel portion 116.

Plunger 250 further includes a threaded body portion 254 for cooperating with a threaded bore 230 in the front wall 232 of base portion 210. In addition, plunger 250 includes a handle portion 256 for manually controlling the movement of the shaft 252 within the body portion 210 relative to the base portion 210. A locking nut 260 cooperates with the threaded body portion 254 of plunger 250 for securing the plunger 250 relative to the base portion 210.

As best seen in FIG. 3, the peripheral wall that surrounds reception port 216 defines a retaining lip 240. This retaining lip 240 rides within a gap that is formed between the upper surfaces of keys 120, 122 and 124 and the bottom surface of the upper barrel section 116a of barrel portion 116. Three spring loaded pistons 150a-150c are retained in bores 152a-152c in the barrel portion 116 to bear against a circular plate 270 secured to an interior surface of the top wall 212 of base portion 210 by threaded fasteners 272 through plate apertures 275. The pistons are dimensioned an configured 150a-150c urge the upper surfaces of the keys 120, 122 and 124 against the retaining lip 240 when the keys are rotated out of alignment with the keyways 220, 222 and 224 to add frictional resistance against the rotation of the barrel 116 within the reception port 216. Additionally, the spring loaded pistons 150a-150c serve to take up any inherent and necessary clearance within the assembly to minimize or otherwise eliminate rattle during vibratory loading while in use.

Figure 4:
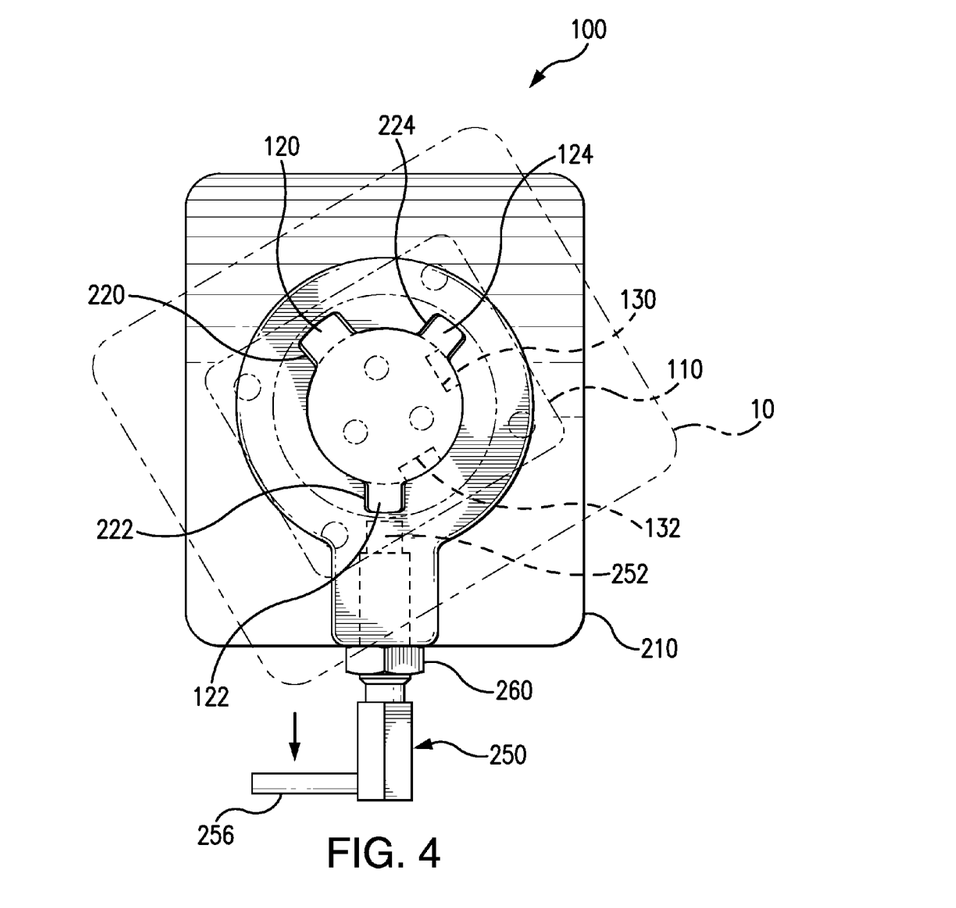
FIG. 4 is a top plan view of the mounting assembly of the subject invention, with the adapter portion disposed in an initial engaged position with respect to the base portion, so that the keys are aligned with the keyways and the display device is oriented 30° from its landscape position.

Referring to FIG. 4, the keys (120, 122 and 124) of the barrel portion 116 of adapter 110 and the keyways (220, 222 and 224) in the reception port 216 of base portion 210 are positioned so that in an initial aligned engagement position of the barrel portion 116 within the reception port 216 corresponds to the display device 10 having an orientation that is offset 30° clockwise from the landscape position display device. This is the only position in which the keys and keyways are aligned. In this position, the engagement shaft 254 of the plunger 250 is refracted so that the barrel portion 116 can rotate freely within the reception port 216 of the base portion 210.

Figure 5:
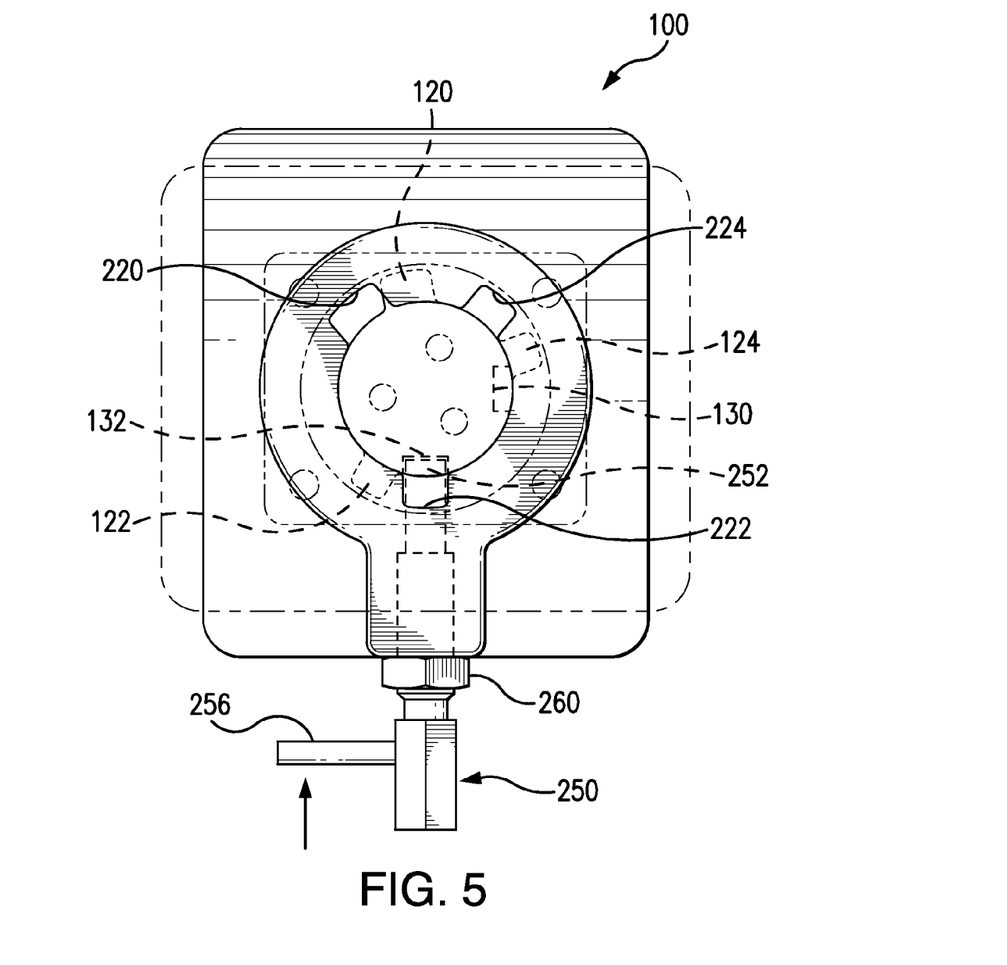
FIG. 5 is a top plan view of the mounting assembly of the subject invention, with the adapter portion rotated 30° in a clockwise direction relative to the base portion, so that the keys are out of alignment with the keyways, and the display device is oriented in its landscape position.

Referring now to FIG. 5, there is illustrated a view of the mounting assembly 100 when the display device 10 has been rotated into a landscape position. This position is advanced 30° in a clockwise direction from the orientation shown in FIG. 4. In this position, the keys (120, 122 and 124) on the lower barrel section 116b of adapter portion 110 and the keyways (220, 222 and 224) in the reception port 216 of base portion 210 are rotated out of alignment. Furthermore, the engagement shaft 254 of the plunger 250 is advanced forward using the handle portion 256 so as to engage the radially inwardly extending recess 130 in the lower barrel section 116b, and thereby fix the position of the adapter portion 110 relative to the base portion 210.

Figure 6:
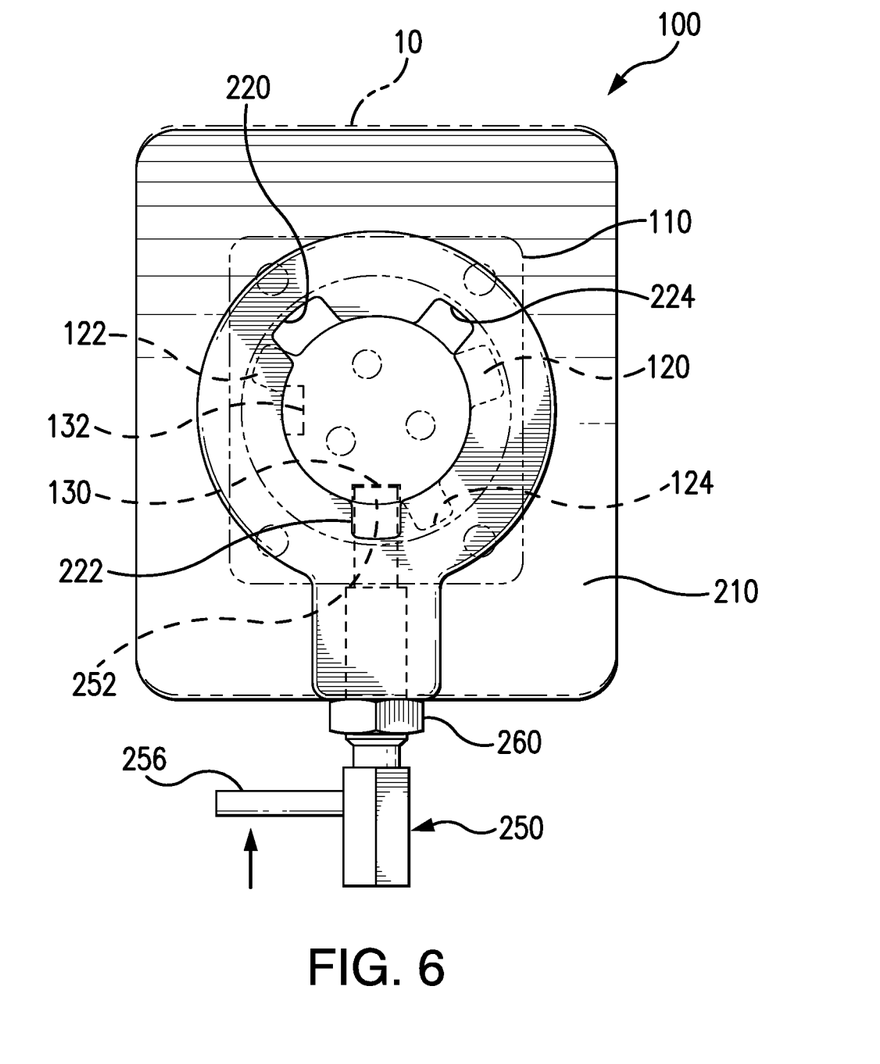
FIG. 6 is a top plan view of the mounting assembly of the subject invention, with the adapter portion rotated 90° from the position shown in FIG. 5, in a clockwise direction relative to the base portion, so that the keys remain out of alignment with the keyways, and the display device is oriented in its portrait position.

Turning to FIG. 6, there is illustrated a view of the mounting assembly 100 when the display device 10 has been rotated into a portrait position. This position is advanced 90° in a clockwise direction from the orientation shown in FIG. 5, and 120° in a clockwise direction from the orientation shown in FIG. 5. In this position, the keys (120, 122 and 124) on the lower barrel section 116b of adapter portion 110 and the keyways (220, 222 and 224) in the reception port 216 of base portion 210 are still out of alignment. In addition, the engagement shaft 254 of the plunger 250 is engaged in the radially inwardly extending recess 132 in the lower barrel section 116b, so as to fix the position of the adapter portion 110 relative to the base portion 210.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. An assembly for mounting an electronic display device to a supporting structure within a cockpit of an aircraft, comprising:
   a) an adapter portion configured for attachment to a rear surface of an electronic display device, the adapter portion having a cylindrical barrel portion extending away from the rear surface of the display device, the barrel portion having a first radially inwardly extending recess corresponding to a landscape position of the display device and a second radially inwardly extending recess corresponding to a portrait position of the display device;
   b) a base portion configured for mounting to a fixed structure in the cockpit of an aircraft, the base portion including an upper surface with a circular reception port formed therein for receiving the barrel portion of the adapter plate; and
   c) a plunger operatively associated with the base portion for selectively engaging the first and second recesses in the barrel portion of the adapter portion to prevent relative rotation of the adapter portion and the base portion.

2. An assembly as recited in claim 1, wherein the adapter portion includes a mounting plate for securement to the rear surface of the display device, and the barrel portion extends from the mounting plate.

3. An assembly as recited in claim 1, wherein the barrel portion includes a plurality of radially outwardly extending circumferentially disposed keys, and the reception port includes a plurality of radially outwardly extending circumferentially disposed keyways for receiving the plurality of keys on the barrel portion of the adapter portion.

4. An assembly as recited in claim 3, wherein the plurality of keys and corresponding keyways are positioned so that an initial engagement position of the barrel portion within the reception port corresponds to the display device having an orientation that is 30° degrees clockwise from the landscape position of the display and 120° clockwise from the portrait position of the display device.

5. An assembly as recited in claim 3, wherein the barrel portion includes a circumferential slot located axially above the plurality of keys for engaging an annular retaining lip surrounding the reception bore in the upper surface of the base portion.

6. An assembly as recited in claim 5, wherein the adapter portion includes a plurality of spring loaded plungers mounted to bear against a bottom plate of the base portion to provide pressure against the retaining lip to add resistance against rotation.

7. An assembly as recited in claim 1, further comprising a locking nut for selectively securing the plunger in an engagement position.

8. An assembly for mounting an electronic display device to a supporting structure within a cockpit of an aircraft, comprising:
   a) an adapter portion configured for attachment to a rear surface of an electronic display device, the adapter portion having a cylindrical barrel portion extending away from the rear surface of the display device, the barrel portion having a plurality of circumferentially disposed radially outwardly extending keys;
   b) a base portion configured to be mounted to a fixed structure in the cockpit of an aircraft, the base portion including an upper surface with a circular reception port formed therein for receiving the barrel portion of the adapter portion, the reception port having a plurality of radially outwardly extending circumferentially disposed keyways formed therein for receiving the plurality of keys on the barrel portion of the adapter portion; and
   c) a plunger operatively associated with the base portion for selectively engaging the barrel portion of the adapter portion to prevent relative movement of the adapter portion and the base portion.

9. An assembly as recited in claim 8, wherein the adapter portion includes a mounting plate for securement to the rear surface of the display device, and the barrel portion extends from the mounting plate.

10. An assembly as recited in claim 8, wherein the barrel portion includes a first radially inwardly extending recess corresponding to a landscape position of the display device and a second radially inwardly extending recess corresponding to a portrait position of the display device.

11. An assembly as recited in claim 8, wherein the plurality of keys and corresponding keyways are positioned so that an initial engagement position of the barrel portion within the reception port corresponds to the display device having an orientation that is 30° degrees clockwise from the landscape position of the display and 120° clockwise from the portrait position of the display device.

12. An assembly as recited in claim 8, wherein the barrel portion includes a circumferential slot located axially above the plurality of keys for engaging an annular retaining lip surrounding the reception bore in the upper surface of the base portion.

13. An assembly as recited in claim 8, wherein the adapter portion includes a plurality of spring loaded plungers mounted to bear against a bottom plate of the base portion to provide pressure against the retaining lip to add resistance against rotation.

14. An assembly as recited in claim 8, further comprising a locking nut for selectively securing the plunger in an engagement position.

15. An assembly for mounting an electronic display device to a supporting structure within a cockpit of an aircraft, comprising:
   a) an adapter portion configured for attachment to a rear surface of an electronic display device, the adapter portion having a cylindrical barrel portion extending away from the rear surface of the display device, the barrel portion having a plurality of circumferentially disposed radially outwardly extending keys, a first radially inwardly extending recess corresponding to a landscape position of the display device and a second radially inwardly extending recess corresponding to a portrait position of the display device;
   b) a base portion configured to be mounted to a fixed structure in the cockpit of an aircraft, the base portion including an upper surface with a circular reception port formed therein for receiving the barrel portion of the adapter portion, the reception port having a plurality of radially outwardly extending circumferentially disposed keyways formed therein for receiving the plurality of keys on the barrel portion of the adapter portion; and
   c) a plunger operatively associated with the base portion for selectively engaging the first and second recesses in the barrel portion of the adapter plate to prevent relative rotation of the adapter plate and the base portion.

16. An assembly as recited in claim 15, wherein the adapter portion includes a mounting plate for securement to the rear surface of the display device, and the barrel portion extends from the mounting plate.

17. An assembly as recited in claim 15, wherein the barrel portion includes three circumferentially disposed keys thereon, and the reception port has three corresponding keyways formed therein.

18. An assembly as recited in claim 15, wherein the three keys and three keyways are positioned so that an initial engagement position of the barrel portion within the reception port corresponds to the display device having an orientation that is 30° degrees clockwise from the landscape position of the display and 120° clockwise from the portrait position of the display device.

19. An assembly as recited in claim 15, wherein the barrel portion includes a circumferential slot located axially above the three keys for engaging an annular retaining lip surrounding the reception bore in the upper surface of the base portion.

20. An assembly as recited in claim 15, wherein the adapter portion includes a plurality of spring loaded plungers mounted to bear against a bottom plate of the base portion to provide pressure against the retaining lip to add resistance against rotation.

* * * * *